United States Patent Office 2,712,004
Patented June 28, 1955

2,712,004

POLYMERIZABLE AND POLYMERIZED COMPOSITIONS COMPRISING AN ALLYLMELAMINE OR ALLYLISOMELAMINE

Walter M. Thomas, Springdale, Conn., assignor to American Cyanamid Company, New York, N. Y., a corporation of Maine No Drawing. Application October 28, 1952,
Serial No. 317,370

21 Claims. (Cl. 260—85.5)

This application is a continuation-in-part of my copending application Serial No. 234,468, filed June 29, 1951, and now abandoned.

This invention relates to the production of new synthetic materials having valuable and characteristic properties, and more particularly is concerned with polymerizable and polymerized compositions comprising an allylmelamine or allylisomelamine. Still more particularly the present invention is directed to polymerizable compositions comprising (1) a compound of the class of compounds consisting of (a) melamines represented by the general formula I
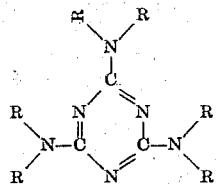

where at least one and not more than three of the R's represent the radical —CH₂—CH=CH₂ and the remaining R's are a member of the class consisting of hydrogen and alkyl, cycloalkyl, aryl (including alkaryl) and aralkyl radicals, and (b) isomelamines corresponding to the melamines of (a), and (2) a substance which is different from the compound of (1), which is copolymerizable therewith, and which is selected from the class of unsaturated substances consisting of (A) compounds containing a CH₂=C< grouping, (B) unsaturated alkyd resins produced by reaction of ingredients comprising a polyhydric alcohol and an ethylenically unsaturated polycarboxylic compound, and (C) mixtures of (A) and (B), the compound of (1) constituting from about 1% to about 75% by weight of the total amount of (1) and (2). Examples of such polymerizable compositions are those wherein the substance of (2) is a vinyl compound, more particularly a vinyl aliphatic compound (e. g., acrylonitrile, acrylic esters, acrylamide, etc.), or a vinyl aromatic compound, e. g., styrene, etc., within the aforementioned proportions by weight, for instance in proportions such that the compound of (1) constitutes from about 1% to about 20% by weight of the total amount of (1) and (2).

The scope of the invention also includes products comprising the polymerized compositions obtained by polymerization of the aforementioned polymerizable compositions, e. g., a copolymer of a mixture of copolymerizable ingredients including acrylonitrile [or other unsaturated substance of the kind broadly described under (2), supra] and a compound (or a plurality of compounds) of the kind embraced by Formula I, in the aforementioned proportions by weight, e. g., in a weight ratio of from about 1% to about 20% (more particularly from about 1 or 2% to about 10 or 15%) of the allylmelamine or allylisomelamine (or mixtures thereof) to from about 99% to about 80% (more particularly from about 98 or 99% to about 85 or 90% of the unsaturated substance of (2), supra. The scope of the invention further includes methods of preparing such products.

Illustrative examples of radicals which R in the above formula represents are: alkyl (e. g., methyl, ethyl, propyl, isopropyl, butyl, secondary-butyl, pentyl, hexyl to dodecyl, etc.); cycloalkyl (e. g., cyclopentyl, cyclohexyl, cycloheptyl, etc.); aryl (e. g., phenyl, diphenyl or xenyl, naphthyl, etc.), including alkaryl (e. g., tolyl, xylyl, ethylphenyl, propylphenyl, isopropylphenyl, tert.-butylphenyl, etc.); and aralkyl (e. g., benzyl, phenylethyl, phenylisopropyl, etc.).

Melamines of the kind embraced by Formula I and the corresponding isomelamines, which compounds are used in producing the new copolymers of the present invention, can be made by various known methods. Thus, the melamines can be prepared by methods such as are generally described in Patent No. 2,361,823. Allylisomelamines used in practicing the present invention, more particularly substituted isomelamines containing at least one and not more than three allyl radicals, likewise can be prepared in any suitable manner. For instance the monoallyl derivatives can be produced by methods such as are described in Patent No. 2,481,758; and the polyallyl derivatives, specifically the triallyl derivatives, can be produced as described in, for example, Beilstein 26, 251.

There is considerable uncertainty as to the exact structural formula of the isomelamines. Taking monoallylisomelamine as illustrative of the mono-substituted isomelamines used in practicing the present invention, the formula for this compound may be written either as II
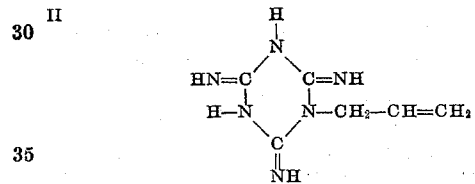

or as

III
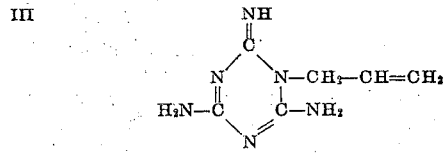

It will be understood, of course, that in these formulas for the monoallyl derivatives used in carrying my invention into effect, the hydrogen atom attached to the imino nitrogen atom, as well as either or both of the hydrogen atoms attached to the amino nitrogen atoms, can be replaced by a radical corresponding to the radical represented by R in Formula I. The formula for triallylisomelamine, which also can be used in practicing my invention, is believed to be as follows:

IV
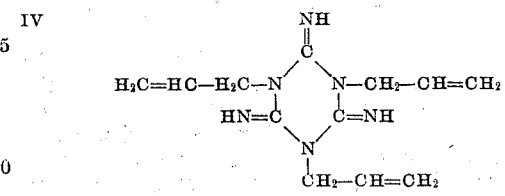

In the imino (=NH) groupings in Formula IV the hydrogen atom of any or all of these groupings can be replaced by a radical corresponding to R in Formula I to yield substituted triallylisomelamines that also can be used as comonomers in producing the new copolymers of my invention.

It is one of the primary objects of the present invention to prepare a new class of copolymers for use in industry.

Another object of the invention is to provide polymerizable or potentially polymerizable molding and other compositions which have good storage stability and which can be handled without difficulty prior to and during fabrication.

Still another object of the invention is to prepare synthetic materials which are particularly useful as coating, impregnating, adhesive, laminating and similar compositions, and as components of such compositions.

Another object of the invention is to prepare molding compositions from which can be produced clear, molded or translucent molded articles having a wide variety of domestic and industrial applications.

Another object of the invention is to prepare clear and colorless cast articles, as well as laminated moldings having high strength characteristics combined with other desirable properties.

Another object of the invention is to improve the usefulness of allylmelamines and allylisomelamines of the kind embraced by Formula I whereby their field of utility is enhanced.

Still another, and one of the most important objects of the present invention, is the production of new acrylonitrile copolymer compositions which are more readily dyed, especially with acid dyes, than homopolymeric acrylonitrile or many of the copolymers of acrylonitrile and another monomer or monomers that were known or suggested prior to my invention.

Another object of the invention is to prepare such copolymers which can be spun or otherwise shaped to form filaments, tapes, ribbons, tubes, rods, sheets, etc., and the shaped articles then dyed either before or after having been oriented or treated to improve their useful properties.

Other objects of the invention will be apparent to those skilled in the art from the description and examples which follow.

These objects are accomplished, in general, by preparing a copolymer of the aforementioned ingredients, in the weight proportions hereinbefore stated, by any suitable means. The copolymer advantageously is produced, for instance, by polymerizing the mixture of unsaturated materials with the aid of a polymerization catalyst or catalysts. In certain cases, for example, when acrylonitrile is the unsaturated material that is copolymerized with the allylmelamine or allylisomelamine, the polymerization can advantageously be effected in an aqueous medium, with the aid of a polymerization catalyst or catalysts; and, at the end of the polymerization period, isolating the resulting copolymer.

Examples of monomers containing a $CH_2=C<$ grouping that can be copolymerized with a compound of the kind embraced by Formula I, which are different therefrom, and which can be polymerized either singly or a plurality (two, three, four or any desired number) thereof, the latter often being desirable in order to improve the compatibility and copolymerization characteristics of the mixture of monomers and to obtain new and valuable copolymers having the particular properties desired for a particular service application, are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated, aliphatic and aromatic, monobasic and polybasic acids such, for instance, as acetic, propionic, butyric, valeric, caproic, acrylic and alpha-substituted acrylic (including alkacrylic, e. g., methacrylic, ethacrylic, propacrylic, etc., and arylacrylic, e. g., phenylacrylic, etc.), crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e. g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e. g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri- and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyldibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e. g., alpha-methyl styrene, alpha-methyl-para-methyl, etc.; unsaturated ethers, e. g., ethyl vinyl ether, diallyl ether, ethyl methallyl ether, etc.; unsaturated amides, for instance N-allyl caprolactam, acrylamide, and N-substituted acrylamides, e. g., N-methylol acrylamide, N-allyl acrylamide, N-methyl acrylamide, N-phenyl acrylamide, etc.; unsaturated ketones, e. g., methyl vinyl ketone, methyl allyl ketone, etc.; methylene malonic esters, e. g., methylene methyl malonate, etc.; ethylene; butadienes, e. g. 1,3-butadiene, 2-chlorobutadiene, etc.; unsaturated polyhydric alcohol (e. g., butenediol, etc.) esters of saturated and unsaturated, aliphatic and aromatic, monobasic and polybasic acids, illustrative examples of which appear above.

Other examples of monomers that can be copolymerized with an allylmelamine or allyl isomelamine of the kind embraced by Formula I are the vinyl halides, more particularly vinyl fluoride, vinyl chloride, vinyl bromide and vinyl iodide, and the various vinylidene compounds, including the vinylidene halides, e. g., vinylidene chloride, vinylidene bromide, vinylidene fluoride and vinylidene iodide, other comonomers being added if needed in order to improve the compatibility and copolymerization characteristics of the mixed monomers.

Other and more specific examples of monomeric materials which may be mixed or blended with the compound of Formula I and the resulting homogeneous or substantially homogeneous, polymerizible composition then polymerized, as hereinafter more fully described, to yield new and valuable copolymer compositions are the allyl compounds which are different from the allyl compound embraced by Formula I and especially those which have a boiling point of at least about 60° C. Of the monomeric materials which may be used the allyl esters form a large class, all of which are suitable. The reactive allyl compounds employed are preferably those which have a high boiling point such, for example, as diallyl maleate, diallyl fumarate, diallyl phthalate, diallyl succinate, etc. Other allyl compounds which are not necessarily high boiling also may be used.

More specific examples of allyl compounds that can be copolymerized with the allyl compound of Formula I are allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl azelate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetrallyl silane, tetrallyl silicate, hexallyl disiloxane, etc. Other examples of allyl compounds that may be employed are given, for example, in Kropa Patent No. 2,510,503, issued June 6, 1950.

Among the comonomers which are preferred for use in carrying my invention into effect are the vinyl compounds, including the vinyl aromatic compounds, more particularly the vinyl aromatic hydrocarbons (e. g., styrene, the various dialkyl styrenes, etc.), and the vinyl aliphatic compounds, e. g., acrylonitrile, acrylamide, etc., and other compounds containing a $CH_2=C<$ grouping, e. g., the various substituted acrylonitriles (e. g., methacrylonitrile, ethacrylonitrile, phenylacrylonitrile, etc.), the various substituted acrylamides (e. g., methacrylamide, ethacrylamide, the various N-substituted acrylamides and alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the methyl, ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids, including the alkyl acrylates containing not more than four carbon atoms in the ester grouping, examples of which are given above, as well as other vinyl aromatic and vinyl aliphatic compounds, and other compounds containing either a single $CH_2=C<$ grouping or a plurality of $CH_2=C<$ groupings. Other examples are given in, for instances, Thomas and Kropa Patent No. 2,601,572, dated June 24, 1952, where examples are given both by classes and species; see, for instance, column 11, line 54, through line 35, column 12, of this patent.

Substantially insoluble, substantially infusible resins may be prepared by means of the chemical reaction or polymerization of a mixture containing a resin possessing a plurality of polymerizably reactive alpha-beta-enal groups (that is, the grouping

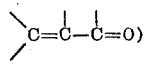

and an allyl compound of the kind embraced by Formula I. Such mixtures may be utilized in coating compositions, molding compositions, laminating compositions, casting compositions, adhesives, etc. The resins used in such mixtures and which possess a plurality of polymerizably reactive alpha-beta-enal groups are designated herein as "reactive resins" or as "unsaturated alkyd resins." They also properly may be described as being unsaturated alkyd resins produced by reaction of ingredients comprising a polyhydric alcohol and an ethylenically unsaturated polycarboxylic compound, more particularly such a compound wherein the ethylenically unsaturated grouping is alpha to a carbonyl group.

Among the reactive resins used in practicing my invention as a reactant with an allyl compound of the kind embraced by Formula I are those which are derived from unsaturated alpha,beta-organic acids of the aliphatic series and, therefore, contain the reactive groupings present in those acids. The terms "unsaturated alpha,beta-organic acid" and "alpha,beta-unsaturated organic acid," as commonly used in the art, do not include acids wherein the unsaturated grouping is part of an aromatic-acting radical, as for example phthalic acid, and the same definition is adopted herein. Instead of the unsaturated polycarboxylic acids, the available anhydrides thereof also may be employed in producing the unsaturated alkyd resin. The unsaturated alkyd resins are preferably produced by the esterification of an unsaturated alpha,beta-polycarboxylic acid of the aliphatic series, more particularly an alpha,beta-unsaturated polycarboxylic acid, with a polyhydric alcohol, and particularly a glycol. Although esterification of the acid with a polyhydric alcohol is perhaps one of the simplest, most convenient ways of obtaining a reactive resin, I am not precluded from using resins otherwise derived from unsaturated alpha, beta-organic acids. I also may employ a crystalline unsaturated alkyd resin obtained by the reaction of a glycol, which is completely symmetrical, with an alpha, beta-unsaturated dicarboxylic acid having a transfiguration such as fumaric acid. The unsaturated alkyd resin is preferably one having an acid number not greater than 50, although in some cases resins having an acid number as high as 100 may be employed. The term "unsaturated alkyd resin" as used herein does not include within its meaning the conventional drying oil- or drying oil acid-modified alkyd resins in the preparation of which an aromatic or saturated aliphatic polycarboxylic acid or anhydride is used.

Illustrative examples of unsaturated alkyd resins that may be employed are those produced by reaction of the following ingredients: ethylene glycol and maleic anhydride; glycerine and maleic anhydride; diethylene glycol, maleic anhydride and phthalic anhydride; diethylene glycol and itaconic acid; ethylene glycol, maleic anhydride and succinic acid; ethylene glycol, maleic anhydride and tetrafluorosuccinic acid; ethylene glycol, itaconic acid and phthalic anhydride; diethylene glycol, maleic anhydride and tung oil acids; ethylene glycol, maleic anhydride, linseed oil acids and phthalic anhydride; diethylene glycol and maleic anhydride; ethylene glycol, maleic anhydride and stearic acid; diethylene glycol, maleic anhydride and decyl alcohol; ethylene glycol, maleic anhydride, octyl alcohol and acetic anhydride; diethylene glycol, fumaric acid, tetrahydroabietyl alcohol and linseed oil fatty acids; alpha-propylene glycol and maleic anhydride; diethylene glycol, fumaric acid and benzyl alcohol; diethylene glycol, fumaric acid and tetrahydroabietyl alcohol; ethylene glycol, fumaric acid and omega-hydroxydecanoic acid; diethylene glycol, fumaric acid and linseed oil fatty acid monoglycerides; etc. Reference is made to the following patents for more detailed information regarding the ingredients, the preparation, and additional examples of modified and unmodified unsaturated alkyd resins that may be copolymerized with an allyl compound of the kind embraced by Formula I to yield new synthetic compositions having a wide variety of commercial applications: 2,409,633, 2,443,740, 2,443,741, 2,485,294, and 2,510,503.

Mixtures of any of the aforementioned polymerizable materials may be copolymerized with a single or with a plurality of allylmelamines or allylisomelamines of the kind embraced by Formula I. For example, I may copolymerize with the allylmelamine or allylisomelamine an unsaturated alkyd resin alone, e. g., diethylene glycol maleate, etc., or, also alone, a compound containing a $CH_2=C<$ grouping (which compound is different from the particular compound embraced by Formula I that is employed in making the particular copolymer), e. g., styrene, diallyl succinate, triallyl cyanurate, etc., or a mixture of such a resin and compound. Mixtures of different unsaturated alkyd resins and of different compounds containing a $CH_2=C<$ grouping sometimes may be employed advantageously in making a copolymer thereof with an allyl compound of the kind embraced by Formula I. Useful copolymer compositions also can be produced by copolymerization of different allyl compounds of the kind within the scope of Formula I, for instance a copolymer of N-allylmelamine and N,N-diallylmelamine or a copolymer of monoallylisomelamine with N-allylmelamine, N,N-diallylmelamine or N-allyl-N-phenylmelamine, or any of the other allylmelamines embraced by Formula I or mixtures thereof. The latter copolymers can be used advantageously in modifying homopolymeric and copolymeric acrylonitrile to improve the dyeability of the latter, in which case they usually constitute from about 1% to about 20% by weight of the blend of polymers.

Any suitable means may be used in effecting copolymerization of the allylmelamine and/or -isomelamine with the reactant which is copolymerizable therewith. Heat, light, or both heat and light, with or without a polymerization catalyst, can be used. A polymerization catalyst preferably is employed in order to shorten the period of time required for polymerization of the mixture of ingredients. Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dibutyl peroxide, dilauryl peroxide, dioleyl peroxide, distearyl peroxide, di-(tert.-butyl) peroxide and di-(tert.-amyl) peroxide, such peroxides often being designated as ethyl, propyl, butyl, lauryl, oleyl, stearyl, tert.-butyl and tert.-amyl peroxides; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic per-acids, e. g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxide catalysts that can be employed are the following:

Tetralin hydroperoxide
Tert.-butyl diperphthalate
Cumene hydroperoxide
Tert.-butyl perbenzoate
2,4-dichlorobenzoyl peroxide
Urea peroxide
Caprylyl peroxide
p-Chlorobenzoyl peroxide
2,2-bis(tert.-butyl peroxy) butane
Hydroxyheptyl peroxide
Diperoxide of benzaldehyde Other so-called "free radical" types of catalysts, e. g., $\alpha,\alpha'$azodiisobutyronitrile, can also be used to accelerate polymerization.

If desired, the mixture of copolymerizable ingredients may be polymerized in emulsion or in solution state to yield a copolymer. Good results are obtained by effecting copolymerization while the aforesaid ingredients are dissolved in a suitable solvent, for example water or a liquid solvent comprising mainly water when the comonomer is acrylonitrile. Suitable inert organic solvents also can be used if desired, e. g., benzene, toluene, xylene, etc.

The polymerization also can be effected by conventional bulk polymerization technique, in the presence or absence of a solvent capable of dissolving the copolymerizable mixture and in which the latter preferably is inert; or by conventional bead polymerization methods. The polymerization of the mixture can be effected by a continuous process as well as by a batch operation.

The concentration of the catalyst is relatively small, e. g., from, by weight, about 1 part of catalyst per 1000 parts of the mixture of copolymerizable ingredients to about 3 or 4 parts of catalyst per 100 parts of the aforesaid mixture.

The temperature of polymerization of the polymerizable composition comprising an allylmelamine or -isomelamine of the kind with which this invention is concerned, and in the proportions specified in the second paragraph of this specification, can be varied over a wide range, up to and including or slightly above the boiling point (at atmospheric pressure) of the polymerizable mixture. In most cases, the polmerization temperature will be within the range of about 20° or 30° C., preferably at least 35° or 40° C., up to the boiling temperatre of the polymerizable mixture, depending, for example, upon the particular catalyst, if any, used, the rapidity of polymerization wanted and other influencing factors. The use of polymerization temperatures substantially above the boiling point of the aforesaid mixture is not precluded, but generally is less desirable because the polymerization reaction then must either be carried out in a closed reaction vessel under pressure, or, for economical reasons, with a reflux condenser or other means provided for the recovery and re-use of the volatilized monomer or monomers if the reaction is carried out at the boiling temperature of the mass under atmospheric pressure.

If desired, the reactive ingredients may be copolymerized in the presence of a plasticizer for the copolymer. Other copolymerization methods, however, also may be employed, e. g., methods such as those described in U. S. Patents 2,140,048, 2,160,054, 2,194,354, 2,333,635, 2,436,926, and British Patent 586,881 with reference to the production of other polymerization products.

If the copolymerization reaction is carried out while the mixed copolymerizable ingredients are dissolved or dispersed in a liquid medium, e. g., in solution in water, the resulting copolymer then is separated from the said medium by any suitable means, e. g., by filtration, centrifuging, solvent extraction, etc.

In order that those skilled in the art may better understand how the present invention can be carried into effect, the following examples are given by way of illustration and not by way of limitation. All parts and percentages are by weight.

*Example 1*

This example illustrates the preparation of homopolymeric acrylonitrile, which is subsequently employed in comparative tests with certain copolymers of the present invention.

A reaction vessel, equipped with a stirrer, reflux condenser, thermometer and gas-inlet tube, is placed in a constant-temperature bath which is maintained at 35° C. To the vessel is added a solution of 53.0 parts of acrylonitrile, 900 parts of distilled water and 0.29 part of sulfuric acid. The pH of the initial solution is 3.1. A rapid stream of pre-purified nitrogen is passed over the surface of the solution for 30 minutes. The nitrogen flow is then reduced to about one bubble per second. A reduction-oxidation catalyst system ("redox" system) consisting of 1.71 parts of ammonium persulfate and 0.71 part of sodium bisulfite (meta), each dissolved in 50 parts of water, is then added. The solution first becomes cloudy at the end of 3 minutes, and the polymerization is fairly exothermic for the first half hour. The polymerization is continued for a total of 4 hours at 35° C. The polymer is collected on a Büchner funnel, and washed with 1,000 parts of distilled water followed by about 160 parts of methanol. The polymer is dried in an oven at 70° C. for about 16 hours. The yield of dry polyacrylonitrile, which is white, amounts to 48 parts.

*Example 2*

A reaction vessel, equipped with a stirrer, reflux condenesr, thermometer and gas-inlet tube, is placed in a constant-temperature bath which is maintained at 35° C. To the vessel is added a solution of 50.35 parts of acrylonitrile, 2.65 parts of N,N-diallylmelamine, 900 parts of distilled water and 0.65 part of sulfuric acid. The pH of the resulting solution is 3.0. A rapid stream of pre-purified nitrogen is passed over the surface of the solution for 30 minutes. The nitrogen flow is then reduced to about one bubble per second. To the vessel is then added 1.71 parts of ammonium persulfate and 0.36 part of sodium bisulfite (meta), each dissolved in 50 parts of water. The polymerization is carried out for 4 hours at 35° C. The resulting copolymer of acrylonitrile and N,N-diallylmelamine is collected on a Büchner funnel, washed with 1000 parts of deionized water and then dried in an oven at 70° C. for about 16 hours. The yield of dry, white copolymer amounts to 40.2 parts.

Example 3

Same as in Example 2 with the exception that 2.65 parts of methyl acrylate is used in addition to the 50.35 parts of acrylonitrile and 2.65 parts of N,N-diallylmelamine; and 0.71 part, instead of 0.36 part, of sodium bisulfite (meta) is employed. A good yield of a three-component copolymer of acrylonitrile, N,N-diallylmelamine and methyl acrylate is obtained.

Example 4

Same as in Example 2 with the exception that, instead of 2.65 parts of N,N-diallylmelamine, there is used 2.65 parts of N,N',N''-triallylmelamine. Similar results are obtained.

Example 5

Same as in Example 2 with the exception that the N,N-diallylmelamine is replaced by the same amount of N,N'-diallylmelamine. A good yield of a copolymer of acrylonitrile and N,N'-diallylmelamine is obtained.

Example 6

Same as in Example 2 with the exception that 47.7 parts of acrylonitrile and 5.3 parts of N,N-diallylmelamine are used instead of the proportions of these comonomers specified in that example; also, 0.71 part, instead of 0.36 part, of sodium bisulfite (meta) is employed. Similar results are obtained.

Example 7

Essentially the same conditions and procedure are employed as in Example 2 with the exception that the N,N-diallylmelamine is replaced with an equal weight of N-allyl-N-phenylmelamine, the polymerization time is 6 hours, and the polymerization temperature is 25° C. The pH of the initial solution is 3.3. A copolymer of acrylonitrile and N-allyl-N-phenylmelamine is obtained. The yield of white, dry copolymer amounts to 39.5 parts.

Example 8

Essentially the same conditions and procedure are employed as in Example 2 with the exception that the N,N-diallylmelamine is replaced with an equal weight of N-allyl-N-methylmelamine, and the polymerization time is 6 hours at 35° C. A good yield of a white, dry copolymer of acrylonitrile and N-allyl-N-methylmelamine is obtained.

Example 9

Same as in Example 2 with the exception that 2.65 parts of N-allyl-N-cyclohexylmelamine is used instead of 2.65 parts of N,N-diallylmelamine, and the polymerization time is 6 hours at 35° C. Similar results are obtained.

Example 10

Same as in Example 2 with the exception that 47.7 parts of acrylonitrile, 2.65 parts of N-allyl-N-benzylmelamine and 2.65 parts of acrylamide are used instead of 50.35 parts of acrylonitrile and 2.65 parts of N,N-diallylmelamine; also 0.71 part, in place of 0.36 part, of sodium bisulfite (meta) is employed. A good yield of a three-component copolymer of acrylonitrile, acrylamide and N-allyl-N-benzylmelamine is obtained.

Example 11

Same as in Example 2 with the exception that 47.7 parts of acrylonitrile and 5.3 parts of N-allyl-N-tolylmelamine are used instead of 50.35 parts of acrylonitrile and 2.65 parts of N,N-diallylmelamine; and 0.71 part, instead of 0.36 part, of sodium bisulfite (meta). A good yield of a copolymer of acrylonitrile and N-allyl-N-tolylmelamine is obtained.

Example 12

Essentially the same conditions and procedure are employed as in Example 2 with the exception that the N,N-diallylmelamine is replaced with an equal weight of N-allylmelamine (N-monoallylmelamine) and the polymerization time is 5 hours at 35° C. The yield of dry, white copolymer of acrylonitrile and N-monoallylmelamine (allylmelamine) amounts to 39.5 parts.

Example 13

In this example, too, the conditions and procedure are essentially the same as in Example 2 with the exception that the N,N-diallylmelamine is replaced with an equal weight of allylisomelamine (N-allylisomelamine) and the polymerization time is 5 hours at 35° C. The yield of dry, white copolymer of acrylonitrile and N-monoallylisomelamine (N-allylisomelamine) amounts to 48.5 parts.

N-allylisomelamine is prepared, for example, by heating together for 5 hours at 95°–98° C. a mixture of equal molar proportions of allylamine hydrochloride, ammonium chloride and monopotassium 1,3-dicyanoguanidine. The mixture becomes fluid after 10 minutes' heating and slowly solidifies. The temperature is raised to 180 C. by heating the reaction vessel in an oil bath, and heating is continued at that temperature for 16 hours. At the end of the reaction period the cake is broken up and dissolved in 1 liter of boiling water containing 15 ml. of concentrated hydrochloric acid. After treatment with decolorizing carbon, the solution is filtered and cooled. The allylisomelamine (N-allylisomelamine) which separates melts at 184° C. with decompositon.

Example 14

Samples of the homopolymeric acrylonitrile of Example 1 and of the copolymers of Examples 2 to 13, inclusive, are subjected to the following dye test:

A sample (5 parts) of the dry polymer or copolymer (ground in a mill to pass through a 20-mesh screen) is added to a dye bath consisting of 500 parts of an aqueous solution containing 0.2 part of concentrated sulfuric acid, 1 part of sodium sulfate and 0.2 part of Calcocid Alizarine Blue SAPG (Color Index No. 1054). The dye bath is boiled for 30 minutes, after which the polymerization product is filtered off and washed with hot water until the water is free of dye. The copolymers of Examples 2 to 13, inclusive, are dyed blue, the acrylonitrile-allylisomelamine copolymer of Example 13 being a lighter blue than that of Examples 2–12. In marked contrast, no dye is absorbed by the homopolymeric acrylonitrile of Example 1. The advantage of replacing a part (e. g., from about 1% to about 20% or more, still more particularly from 1 or 2% to 5 or 10 or 15%) of the initial acrylonitrile with an allylmelamine and/or allylisomelamine of the kind with which this invention is concerned, thereby to obtain a copolymeric acrylonitrile substance of improved dyeability, is therefore quite apparent.

Other modifying monomers, in addition to the methyl acrylate named in Example 3 and the acrylamide specified in Example 10, can be used. Numerous examples of such comonomers have been given hereinbefore. The proportions of any modifying comonomer or comonomers that are incorporated in the polymerizable compositon together with the acrylonitrile and the allylmelamine and/or -isomelamine can be varied as desired or as conditions may require. Ordinarily, however, the acrylonitrile constitutes a major or preponderant proportion (more than 50%) by weight of the total weight of monomers to be copolymerized, the allyl compound constitutes from about 1% to about 20% of the total weight of the acrylonitrile and allyl compound, and any modifying comonomer or comonomers (if present in the polymerizable mixture) constitute the remainder of the total amount of comonomers which are subjected to copolymerization.

In the preferred acrylonitrile copolymer compositions (more particularly thermoplastic acrylonitrile copolymer compositions) of the present invention, the acrylonitrile is employed in the mixture of comonomers in an amount such that at least 85% by weight of combined acrylonitrile is present in the copolymer. When the polymerization rates of the acrylonitrile and additional monomer or monomers are different from each other, then it may be necessary to start with an amount of acrylonitrile either more or less than 85% by weight of the total mixture of monomers in order that the final copolymer will contain at least 85% by weight of combined acrylonitrile in the copolymer molecule. Similarly, in order that the finished copolymer shall contain, in the copolymer molecule, from about 1% to about 20% by weight of combined allylmelamine and/or -isomelamine, preferably between about 2 or 3% and about 10 or 15%, it may be necessary to start with an amount of the allyl compound, either more or less than that which is present in the finished copolymer in order that the said copolymer will have the ultimate composition desired or required in order to impart optimum dye receptivity thereto.

*Example 15*

| | Parts |
|---|---|
| N-monoallylisomelamine (used in the form of N-monoallylisomelamine hydrochloride, 75 parts) | 61.5 |
| Acrylamide | 25.0 |
| Water | 400.0 |
| Ammonium persulfate, $(NH_4)_2S_2O_8$ | 0.25 |

The N-monoallylyisomelamine hydrochloride and acrylamide are dissolved in the water, and then heated in a reaction vessel, provided with a reflux condenser, on a steam bath. The resulting clear solution is brought from a temperature of 50° C. to 75° C. in 7 minutes, after which the ammonium persulfate is added and the reaction mass is brought to reflux temperature (90°–91° C.) in 3 minutes, and is heated at that temperature for 2½ hours. After standing for about 16 hours, a clear syrup results. This syrupy copolymerization product is poured into 4,000 parts of methanol, yielding a white precipitate. On air-drying, the mass darkens and separates into a gummy phase comprising a copolymer of acrylamide and the allyl compound (probably mostly in the form of combined N-monoallylisomelamine hydrochloride) and a clear liquid comprising a mixture of water and methanol. The liquid is poured off and the gummy copolymer is dried for about 16 hours at 110° C., yielding a tan-colored solid comprising the aforementioned copolymer. This copolymer is suitable for use as a component of textile-finishing compositions, e. g., warp-sizing compositions.

*Example 16*

| | Parts |
|---|---|
| N-monoallylmelamine (N-allylmelamine) | 60.0 |
| Styrene | 40.0 |
| Monomethyl ether of ethylene glycol | 200.0 |
| Cumene hydroperoxide | 5.0 |

The N-allylmelamine is added to the boiling ethylene gylcol monomethyl ether, all but a trace of the allyl compound dissolving in the said solvent. The styrene is added to the solution of the allyl compound, after which 1 part of the cumene hydroperoxide is added, and the solution is heated under reflux for 2 hours. After standing for about 16 hours, another 2 parts of the cumene hydroperoxide is added and refluxing is continued for another 6½ hours, the remainder (2 parts) of the hydroperoxide being added after refluxing has proceeded for 1½ hours. The resulting dark syrup comprising a copolymer of styrene and N-allylmelamine is poured into 4,000 parts of methanol, whereupon the copolymer precipitates as a tan-colored solid, which is filtered off, washed with methanol and air-dried. The dry product is a soft, tan powder which may be used as a modifier of other synthetic materials, e. g., thermosetting aminoplasts such, for instance, as urea-formaldehyde resins, melamine-formaldehyde resins, urea-melamine-formaldehyde resins, etc.

*Example 17*

| | Parts |
|---|---|
| N,N-diallylmelamine | 20.0 |
| Unsaturated alkyd resin produced by reaction of 6.6 moles propylene glycol, 2.0 moles of phthalic anhydride and 4.0 moles of maleic anhydride | 40.0 |
| Benzoyl peroxide | 1.0 |

The N,N-diallylmelamine and unsaturated alkyd resin are heated together at 180° C. to yield a slightly hazy solution, indicating that almost complete solution has been effected. The benzoyl peroxide is added after the solution has been cooled to 100° C. Thereafter the temperature is raised to 150° C. At this temperature a very rapid copolymerization reaction takes place, yielding a hard, opaque, tan, glassy resin. The polymerizable composition of this example may be used in the production of various laminated articles, e. g., glass-cloth laminates.

*Example 18*

| | Parts |
|---|---|
| N,N-diallylmelamine | 20.0 |
| Diallyl phthalate | 20.0 |
| Di-(tert.-butyl) peroxide | 1.0 |

The two allyl compounds are heated together in a reaction vessel to 150° C., at which temperature the peroxide polymerization catalyst is added. A gel comprising a copolymer of the N,N-diallylmelamine and diallyl phthalate is obtained. This gel may be used to thicken oils and other liquids.

*Example 19*

| | Parts |
|---|---|
| N,N-diallylmelamine | 10.0 |
| Diallyl phthalate | 40.0 |
| Di-(tert.-butyl) peroxide | 2.0 |

The same procedure is followed as described under Example 18 with the exception that, after adding the peroxide catalyst, heating of the mixture is continued at 150°–155° C. Within about 4 to 5 minutes, a vigorous polymerization occurs and the mass sets to a stiff, fairly clear, amber-colored gel comprising a copolymer of the aforementioned allyl compounds. The polymerizable composition of this example may be cast and polymerized to yield a hard, cast resin; or it may be mixed with fillers and employed, for example, as a potting compound, thereafter being polymerized in situ.

*Example 20*

| | Parts |
|---|---|
| Methyl methacrylate | 40.0 |
| N,N-diallylmelamine | 10.0 |
| 50% aqueous dispersion of gamma-stearamidopropyl - beta-hydroxyethyldimethylammonium chloride | 5.0 |
| Water | 200.0 |
| HCl (used in the form of aqueous 12N HCl) | 1.75 |

To the mixture of the first four ingredients in a suitable reaction vessel is added the aqueous HCl (nearly one equivalent) which facilitates dissolution of the N,N-diallylmelamine. After next adding 0.10 part of $(NH_4)_2S_2O_8$, the mixture is heated on a steam bath for 2 hours, yielding a stable latex. The copolymer of methyl methacrylate and N,N-diallylmelamine is precipitated by adding isopropyl alcohol, after which it is filtered off, washed with isopropyl alcohol and dried to yield a white powder. A sample of the latex contained 21.5% of solids when determined by evaporation of the sample on a steam bath, then dried for 1 hour at 110° C. The dried copolymeric material is hard, clear and brittle, and is insoluble in ethyl acetate. It is suitable for use as a flatting agent in varnishes and lacquers.

*Example 21*

Essentially the same as in Example 2 with the exception that 26.5 parts each of acrylonitrile and N,N-diallylmelamine are used and 7.2 parts instead of 0.65 part of sulfuric acid. The nitrogen is passed through the reaction vessel rapidly for 15 minutes, after which there is added to the reaction vessel 1.71 parts of ammonium persulfate (dissolved in 40 parts of water) and 0.36 part of sodium meta-bisulfite (dissolved in 36 parts of water). The copolymer of acrylonitrile and N,N-diallylmelamine begins to precipitate at once. The reaction is continued for 6 hours at 35° C. The copolymer is filtered off, washed with 2,000 parts of water, and dried at 90° C. for 2 hours.

*Example 22*

Same as in Example 17 with the exception that, in addition to 20 parts of N,N-diallylmelamine and 40 parts of unsaturated alkyd resin, there is used 15 parts of approximately a 50–50 mixture of o- and p-methyl-styrenes; also, 2 parts instead of 1 part of benzoyl peroxide is employed. Similar results are obtained.

The polymerizable compositions and copolymers of this invention have numerous applications in the plastics, coating, laminating, adhesive, impregnating, electrically insulating, casting, fiber-forming and other arts. For instance, with or without a filler or other additive, they may be used as molding compositions (or as components of molding compositions) from which molded articles are produced by molding the compositions under heat and pressure, e. g., at temperatures of the order of 130° C. or 140° C. to 200° C. and under pressures up to 10,000 pounds or more per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions of my invention can be used in the production of castings of any desired shape or size; as adhesives; in the treatment of paper or paper stock; in coating compositions; and for various other purposes. The copolymer can be formed in situ after application of the polymerizable mixture to the base material to be coated, impregnated or otherwise treated.

Fibers can be produced from certain of the copolymers of the present invention, for example the acrylonitrile copolymers, in the manner described in, for example, Patents 2,558,730, 2,558,731 and 2,558,733. The unoriented and oriented fibers produced from my new copolymers are readily dyed, especially with an acid dye, while the fiber is in either a gel (e. g., hydrogel or aquagel) or a dry state.

In a manner similar to that described hereinbefore with reference to the production of copolymers of an allylmelamine or allylisomelamine of the kind hereinbefore described, other copolymers can be produced by using other compounds embraced by the following broader, general formula:

V

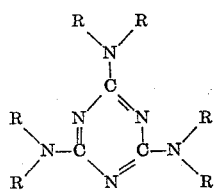

where at least one and not more than three of the R's represent an ethylenically unsaturated, aliphatic, hydrocarbon radical containing at least three and not more than ten carbon atoms, and the remaining R's are a member of the class consisting of hydrogen and alkyl cycloalkyl, aryl (including alkaryl) and aralkyl radicals or an isomelamine corresponding to the melamines of Formula V, or mixtures of such melamines and isomelamines. Illustrative examples of ethylenically unsaturated, aliphatic, hydrocarbon radicals which are embraced by this broader definition of R are: allyl, methallyl, ethallyl, propallyl, 2-butenyl, 3-butenyl, 3-methyl-2-butenyl, 3-methyl-3-butenyl, 2-pentenyl, 3-pentenyl, 4-pentenyl, 2-methyl-2-pentenyl, 3-methyl-4-pentenyl, 2-hexenyl, 2,3-pentadienyl, 2,4-hexadienyl, 2-octenyl, 3-nonenyl, 2-decenyl, etc. The kinds and proportions of copolymerizable ingredients employed are the same as those given hereinbefore.

I claim:

1. A polymerizable composition comprising (1) a compound of the class of compounds consisting of (a) melamines represented by the general formula

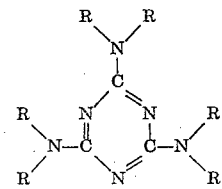

where at least one and not more than three of the R's represent the radical —CH$_2$—CH=CH$_2$ and the remaining R's are a member of the class consisting of hydrogen and alkyl, cycloalkyl, aryl and aralkyl radicals, and (b) isomelamines corresponding to the melamines of (a), and (2) a substance which is different from the compound of (1), which is copolymerizable therewith, and which is selected from the class of unsaturated substances consisting of (A) compounds containing a CH$_2$=C< grouping, (B) unsaturated alkyd resins produced by reaction of ingredients comprising a polyhydric alcohol and an ethylenically unsaturated polycarboxylic compound wherein the only grouping present therein which is reactive with a polyhydric alcohol is an esterifiable carboxy grouping, and (C) mixtures of (A) and (B), the compound of (1) constituting from about 1% to about 75% by weight of the total amount of (1) and (2).

2. A polymerizable composition as in claim 1 wherein the substance of (2) is a vinyl compound.

3. A polymerizable composition as in claim 2 wherein the vinyl compound is a vinyl aliphatic compound.

4. A polymerizable composition as in claim 3 wherein the vinyl aliphatic compound is acrylonitrile.

5. A polymerizable composition as in claim 2 wherein the vinyl compound is a vinyl aromatic compound.

6. A polymerizable composition as in claim 5 wherein the vinyl aromatic compound is styrene.

7. A product comprising the polymerized composition of claim 1.

8. A product comprising the polymerized composition of claim 2.

9. A product comprising the polymerized composition of claim 3.

10. A product comprising the polymerized composition of claim 4.

11. A product comprising the polymerized composition of claim 5.

12. A product comprising the polymerized composition of claim 6.

13. A polymerizable composition comprising (1) acrylonitrile and (2) a compound of the class of compounds consisting of (a) melamines represented by the general formula

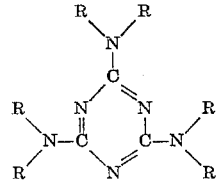

where at least one and not more than three of the R's represent the radical —CH$_2$—CH=CH$_2$ and the remaining R's are a member of the class consisting of hydrogen and alkyl, cycloalkyl, aryl and aralkyl radicals, and (b) isomelamines corresponding to the melamines of (a), the compound of (2) constituting from about 1% to about 20% by weight of the total amount of (1) and (2).

14. A product comprising the polymerized composition of claim 13.

15. A composition comprising a copolymer of a mixture containing (1) acrylonitrile and (2) a compound of the class of compounds consisting of (a) melamines represented by the general formula

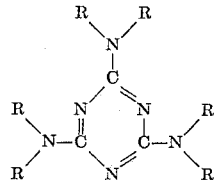

where at least one and not more than three of the R's represent the radical —CH₂—CH=CH₂ and the remaining R's are a member of the class consisting of hydrogen and alkyl, cycloalkyl, aryl and aralkyl radicals, and (b) isomelamines corresponding to the melamines of (a), the compound of (2) constituting from about 1% to about 15% by weight of the total amount of (1) and (2).

16. A composition as in claim 15 wherein the compound of (2) is N-monoallylmelamine.

17. A composition as in claim 15 wherein the compound of (2) is N,N-diallylmelamine.

18. A composition as in claim 15 wherein the compound of (2) is N-allyl-N-phenylmelamine.

19. A composition as in claim 15 wherein the compound of (2) is monoallylisomelamine.

20. The method of preparing a new copolymer which comprises polymerizing, with the aid of a polymerization catalyst, a mixture of copolymerizable ingredients including (1) a compound of the class of compounds consisting of (a) melamines represented by the general formula

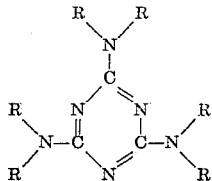

where at least one and not more than three of the R's represent the radical —CH₂—CH=CH₂ and the remaining R's are a member of the class consisting of hydrogen and alkyl, cycloalkyl, aryl and aralkyl radicals, and (b) isomelamines corresponding to the melamines of (a), and (2) a substance which is different from the compound of (1), which is copolymerizable therewith, and which is selected from the class of unsaturated substances consisting of (A) compounds containing a $CH_2=C<$ grouping, (B) unsaturated alkyd resins produced by reaction of ingredients comprising a polyhydric alchohol and an ethylenically unsaturated polycarboxylic compound wherein the only grouping present therein which is reactive with a polyhydric alchol is an esterifiable carboxy grouping, and (C) mixtures of (A) and (B), the compound of (1) constituting from about 1% to about 75% by weight of the total amount of (1) and (2).

21. The method of preparing a new copolymer which comprises polymerizing in an aqueous medium, with the aid of a polymerization catalyst, a mixture of copolymerizable ingredients including (1) acrylonitrile and (2) a compound of the class of compounds consisting of (a) melamines represented by the general formula

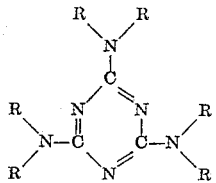

where at least one and not more than three of the R's represent the radical —CH₂—CH=CH₂ and the remaining R's are a member of the class consisting of hydrogen and alkyl, cycloalkyl, aryl and aralkyl radicals, and (b) isomelamines corresponding to the melamines of (a), the compound of (2) constituting from about 1% to about 20% by weight of the total amount of (1) and (2).

References Cited in the file of this patent

Cyanamid New Product Bulletin—N,N-Diallylmeiamine, pages 1 and 8, pub. March 1951 by Am. Cynamid Co.